(12) United States Patent
Hojabri

(10) Patent No.: US 7,142,222 B1
(45) Date of Patent: Nov. 28, 2006

(54) HALFTONE CONTROLLER CIRCUITRY FOR VIDEO SIGNAL DURING ON-SCREEN-DISPLAY (OSD) WINDOW

(75) Inventor: Peyman Hojabri, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/049,466

(22) Filed: Feb. 2, 2005

Related U.S. Application Data

(62) Division of application No. 10/622,613, filed on Jul. 18, 2003, now Pat. No. 6,911,989.

(51) Int. Cl.
G06K 5/40 (2006.01)
G09G 5/02 (2006.01)
G09G 5/00 (2006.01)
H04N 5/445 (2006.01)

(52) U.S. Cl. .................. 345/596; 345/617; 348/678; 348/673; 382/274

(58) Field of Classification Search ........... 345/596, 345/617–619, 629–630, 638, 605, 426, 589, 345/546; 348/673, 678, 573–574, 578, 602, 348/603, 687, 686, 533, 497–498, 508, 553, 348/562–565; 358/534, 536, 447, 461; 382/274
See application file for complete search history.

(56) References Cited

U.S. PATENT DOCUMENTS

| | | | |
|---|---|---|---|
| 5,386,247 A | 1/1995 | Shafer et al. | |
| 5,568,202 A | 10/1996 | Koo | |
| 5,610,664 A | 3/1997 | Bobert | |
| 5,786,864 A | 7/1998 | Yamamoto | |
| 6,166,579 A | 12/2000 | Hojabri et al. | |
| 6,476,821 B1 | 11/2002 | Sawada et al. | |
| 6,498,857 B1 | 12/2002 | Sibbald | |
| 6,650,371 B1 * | 11/2003 | Morrish et al. | 348/569 |
| 2004/0001642 A1 * | 1/2004 | Curry et al. | 382/260 |

OTHER PUBLICATIONS

U.S. Appl. No. 09/602,175, filed Jun. 22, 2000, Morrish et al.
U.S. Appl. No. 09/698,739, filed Oct. 27, 2000, Hojabri.
U.S. Appl. No. 10/439,485, May 16, 2003, Hojabri.
U.S. Appl. No. 10/622,613, filed Jul. 18, 2003, Hojabri.

* cited by examiner

Primary Examiner—Wesner Sajous
(74) Attorney, Agent, or Firm—Vedder, Price, Kaufman & Kammholz

(57) ABSTRACT

Digital circuitry for imparting halftone to that portion of a video image over which an on-screen-display (OSD) window is superimposed.

11 Claims, 17 Drawing Sheets

US 7,142,222 B1

HALFTONE CONTROLLER CIRCUITRY FOR VIDEO SIGNAL DURING ON-SCREEN-DISPLAY (OSD) WINDOW

This is a division of U.S. patent application Ser. No. 10/622,613, filed on Jul. 18, 2003 now U.S. Pat. No. 6,911,989, and entitled "Halftone Controller Circuitry For Video Signal During On-Screen-Display (OSD) Window".

BACKGROUND OF THE INVENTION

1. Field of the Invention

The present invention relates to video signal processing circuitry, and in particular, to video signal processing circuitry within which on-screen-display (OSD) information is inserted for display.

2. Description of the Related Art

Referring to FIG. 1, as video display devices have increased in complexity and sophistication, particularly computer monitors, it is increasingly common for the display 100 in which the video image 101 is displayed to also include an OSD region, or window, 102 in which OSD information is displayed, such as one or more lines of OSD characters 103a, 103b, 103c. As can be seen, however, one difficulty that often arises is when there is little difference in color or contrast between the OSD characters and the underlying video image information. For example, as can be seen in FIG. 1, approximately the first half of the third line 103c of OSD characters is difficult, if not impossible, to read or distinguish from the underlying video image information.

Referring to FIG. 2, it has accordingly become a common practice to alter the contrast of the underlying video image information within the OSD window 102. By reducing the contrast of the background video image information 101 within the OSD window 102, the OSD characters become more readily distinguishable.

Conventional techniques for altering the contrast of the video image information 101 in coincidence with the introduction of the OSD window 102 have included implementations which add digital-to-analog converters (DACs) and analog signal mixers for altering the contrast of the video image information 101 while introducing the OSD information 103 during the OSD window 102. However, such DAC and mixer circuitry can be relatively costly and may introduce undesirable propagation delay and noise. Additionally, such circuitry generally includes a significant amount of analog circuitry which can have undesirable sensitivities to variations in fabrication processes (P), operating voltage (V) and operating temperature (T).

SUMMARY OF THE INVENTION

In accordance with the presently claimed invention, digital circuitry imparts halftone to that portion of a video image over which an on-screen-display (OSD) window is superimposed.

In accordance with one embodiment of the presently claimed invention, a decoder for providing a plurality of digital contrast control signals for a video signal includes halftone and contrast control terminals, signal decoding circuitry and buffer circuitry. A halftone control terminal conveys a halftone control signal with first and second signal statuses corresponding to normal and halftone contrast ranges, respectively, for a video signal. A plurality of contrast control terminals conveys a like plurality of contrast control signals corresponding to the normal video signal contrast range and including, in successive adjacency, a least significant bit (LSB) signal, at least one intermediate significance bit (ISB) signal and a most significant bit (MSB) signal. The signal decoding circuitry, coupled to the halftone control terminal and the plurality of contrast control terminals, responds to reception of the halftone control signal and the plurality of contrast control signals by providing a plurality of decoded control signals which, responsive to the first and second halftone control signal statuses, corresponds to the normal and halftone video signal contrast ranges, respectively, wherein the halftone video signal contrast range is less than the normal video signal contrast range. The buffer circuitry, coupled to the signal decoding circuitry, responds to reception of the plurality of decoded control signals by providing a like plurality of buffered control signals.

In accordance with another embodiment of the presently claimed invention, a decoder for providing a plurality of digital contrast control signals for a video signal includes halftone and contrast controller means, signal decoder means and buffer means. The halftone controller means is for conveying a halftone control signal with first and second signal statuses corresponding to normal and halftone contrast ranges, respectively, for a video signal, wherein the halftone video signal contrast range is less than the normal video signal contrast range. The contrast controller means is for conveying a plurality of contrast control signals corresponding to the normal video signal contrast range and including, in successive adjacency, a least significant bit (LSB) signal, at least one intermediate significance bit (ISB) signal and a most significant bit (MSB) signal. The signal decoder means is for receiving the halftone control signal and the plurality of contrast control signals and in response thereto generating a plurality of decoded control signals which, responsive to the first and second halftone control signal statuses, corresponds to the normal and halftone video signal contrast ranges, respectively. The buffer means is for receiving the plurality of decoded control signals and in response thereto generating a like plurality of buffered control signals.

In accordance with still another embodiment of the presently claimed invention, circuitry for controlling and combining video image and on-screen-display (OSD) signals includes control circuitry and signal combining circuitry. First control circuitry responds to reception of a first reference signal, a halftone control signal, a plurality of contrast control signals and a clamped video signal by providing a first controlled signal with a contrast-controlled video component. The halftone control signal includes first and second signal statuses corresponding to normal and halftone contrast ranges, respectively, for the clamped video signal. The plurality of contrast control signals corresponds to the normal video signal contrast range and includes, in successive adjacency, a least significant bit (LSB) signal, at least one intermediate significance bit (ISB) signal and a most significant bit (MSB) signal. The contrast-controlled video component, responsive to the first and second halftone control signal statuses, corresponds to the normal and halftone video signal contrast ranges, respectively. The halftone video signal contrast range is less than the normal video signal contrast range. First signal combining circuitry, coupled to the first control circuitry, responds to a first combining control signal by receiving and selectively combining an OSD signal and the first controlled signal to provide a first combination signal with the contrast-controlled video component and an OSD component. Second control circuitry, coupled to the first signal combining circuitry, responds to reception of the first combination signal, the first reference signal and a gain control signal by providing a second controlled signal with a contrast-controlled and gain-controlled video component and a gain-controlled OSD component. Second signal combining circuitry, coupled to the second control circuitry, responds to a second combining control signal by receiving and selectively combining the second controlled signal and a second reference signal to provide a second combination signal with the contrast-controlled and gain-controlled video component, the gain-controlled OSD component and a reference signal component.

In accordance with yet another embodiment of the presently claimed invention, circuitry for controlling and combining video image and on-screen-display (OSD) signals includes controller means and signal combiner means. A first controller means is for receiving a first reference signal, a halftone control signal, a plurality of contrast control signals and a clamped video signal and in response thereto generating a first controlled signal with a contrast-controlled video component. The halftone control signal includes first and second signal statuses corresponding to normal and halftone contrast ranges, respectively, for the clamped video signal. The plurality of contrast control signals corresponds to the normal video signal contrast range and includes, in successive adjacency, a least significant bit (LSB) signal, at least one intermediate significance bit (ISB) signal and a most significant bit (MSB) signal. The contrast-controlled video component, responsive to the first and second halftone control signal statuses, corresponds to the normal and halftone video signal contrast ranges, respectively. The halftone video signal contrast range is less than the normal video signal contrast range. A first signal combiner means is for receiving a first combining control signal and in response thereto receiving and selectively combining an OSD signal and the first controlled signal and generating a first combination signal with the contrast-controlled video component and an OSD component. A second controller means is for receiving the first combination signal, the first reference signal and a gain control signal and in response thereto generating a second controlled signal with a contrast-controlled and gain-controlled video component and a gain-controlled OSD component. A second signal combiner means is for receiving a second combining control signal and in response thereto receiving and selectively combining the second controlled signal and a second reference signal and generating a second combination signal with the contrast-controlled and gain-controlled video component, the gain-controlled OSD component and a reference signal component.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators.

The following discussion focuses primarily upon that portion of a video signal path in which a multiplexed video signal is generated containing a contrast-controlled video component, an OSD component and a gain-controlled video component, with a portion of the contrast-controlled video component having halftone contrast coincident with the image window in which OSD information is displayed. Further discussion of one or more overall video systems within which such subsystem is suitable for operation can be found in the following commonly assigned U.S. Patent documents, the contents of which are incorporated herein by reference: Hojabri et al., U.S. Pat. No. 6,166,579, entitled "Digitally Controlled Signal Magnitude Control Circuit"; Morrish et al., U.S. patent application Ser. No. 09/602,175, filed Jun. 22, 2000, entitled "Multiplexed Video Signal Interface Signal, System and Method"; Hojabri, U.S. patent application Ser. No. 09/698,739, filed Oct. 27, 2000, entitled "Multiplexed Video Signal Interface Signal, System and Method"; and Hojabri, U.S. patent application Ser. No. 10/439,485, filed May 16, 2003, entitled "Controllable Signal Baseline and Frequency Emphasis Circuit" (as amended).

Figure 3:
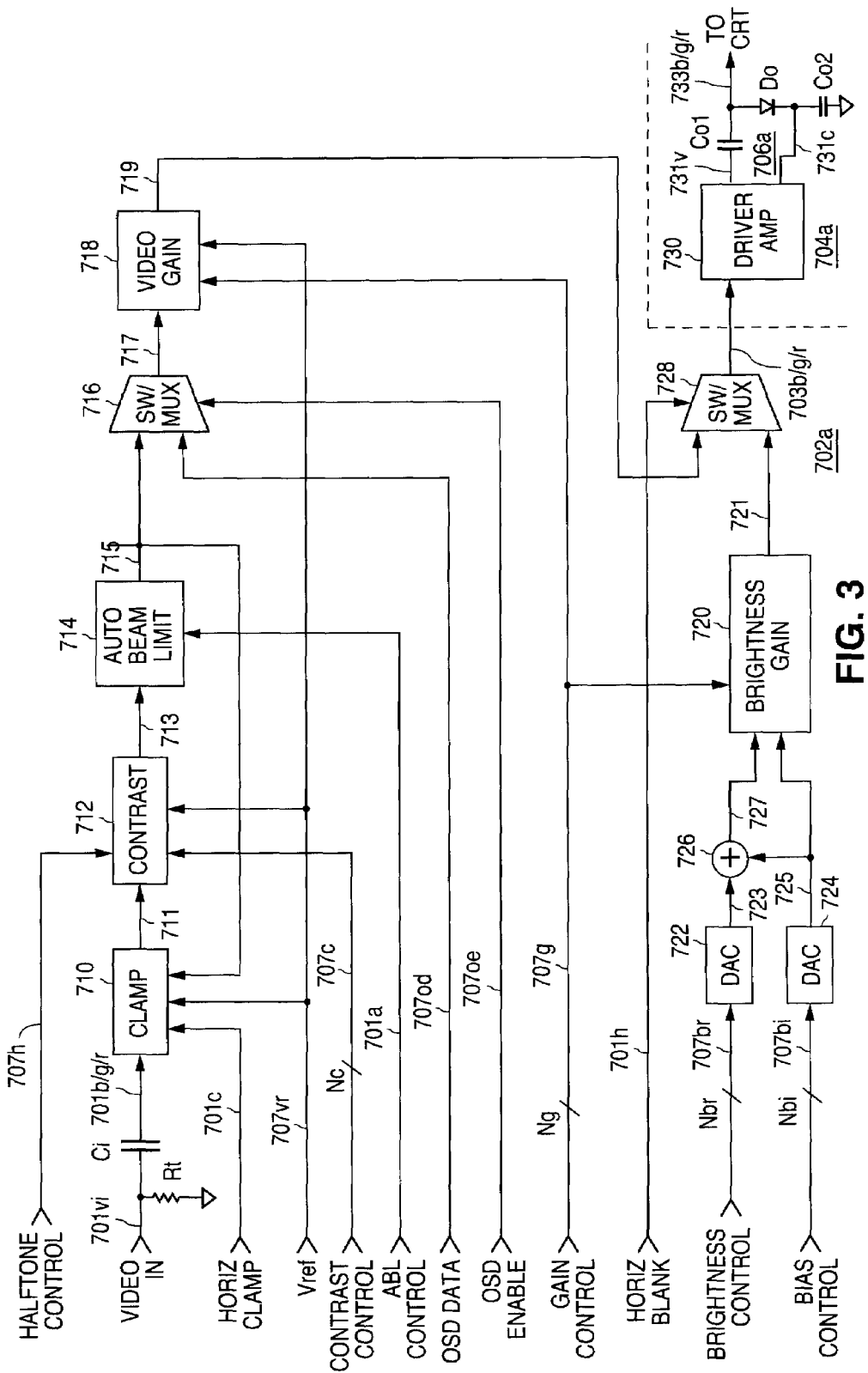
FIG. 3 is a functional block diagram for a video signal path within a multiplexed video signal processing system in which halftone is imparted to that portion of a video image over which an OSD window is superimposed in accordance with the presently claimed invention.

Referring to FIG. 3, one video channel of a system in which halftone video is used during the OSD interval 102 in accordance with the presently claimed invention can be described as follows. The incoming video signal 701vi is terminated with a termination resistor Rt for impedance matching purposes and is AC-coupled with a coupling capacitor Ci. The resulting AC-coupled signal 701b/g/r is DC-clamped by a clamping circuit 710 in accordance with the reference voltage 707vr, the horizontal clamp signal 701c and a voltage level fed back from a subsequent portion of the circuit (discussed in more detail below).

The DC-clamped signal 711 is then processed by a contrast controller 712 in accordance with a halftone control signal 707h, contrast control signals 707c and the reference voltage 707vr. This allows the user to control the contrast of the video information via the contrast control signals 707c (discussed in more detail below).

The contrast-controlled signal 713 is then processed by an auto beam limit circuit 714 (various forms of which are well known in the art) in accordance with the ABL control signal 701a.

The resulting video signal 715 is fed back to the clamp circuit 710 (discussed in more detail below) and to a switch/multiplexor circuit 716 which is used to multiplex this video signal 715 and an OSD data signal 707od in accordance with an OSD enable control signal 707oe. The output signal 717 contains OSD and video information during the time intervals that the OSD control signal 707oe is asserted and de-asserted, respectively.

The resulting video/OSD signal 717 is then controlled with respect to signal gain by a video gain controller 718 in accordance with the reference voltage 707vr and gain control signals 707g (discussed in more detail below).

The resulting signal 719, which has now been DC-clamped, controlled for video contrast, controlled for beam signal strength, combined with OSD information and controlled for video gain, is multiplexed with a signal 721 containing brightness and bias control information in a switch/multiplexor circuit 728 controlled by the horizontal blanking signal 701h.

Digital brightness 707br and bias 707bi control signals are converted to their analog equivalent signals 723, 725 by digital-to-analog converter (DAC) circuits 722, 724. These analog signals 723, 725 are summed in a signal summing circuit 726 and the resulting sum signal 727 and analog bias control signal 725 are processed in a brightness gain controller 720 in accordance with the gain control signals 707g to produce the signal 721 containing the brightness and bias control information (discussed in more detail below).

The resulting multiplexed signal 703b/g/r contains a video component with user-controlled contrast and gain, an OSD component with user-controlled gain, a brightness control component and a CRT bias control component (discussed in more detail below.) This signal 703b/g/r is demultiplexed and amplified by the driver amplifier 730 within the corresponding channel 704a of the CRT driver 704. This produces the video 731v and clamping 731c signals, which are combined in the clamping circuit 706a, needed to produce an appropriately clamped video signal 733b/g/r for the CRT.

Figure 4:
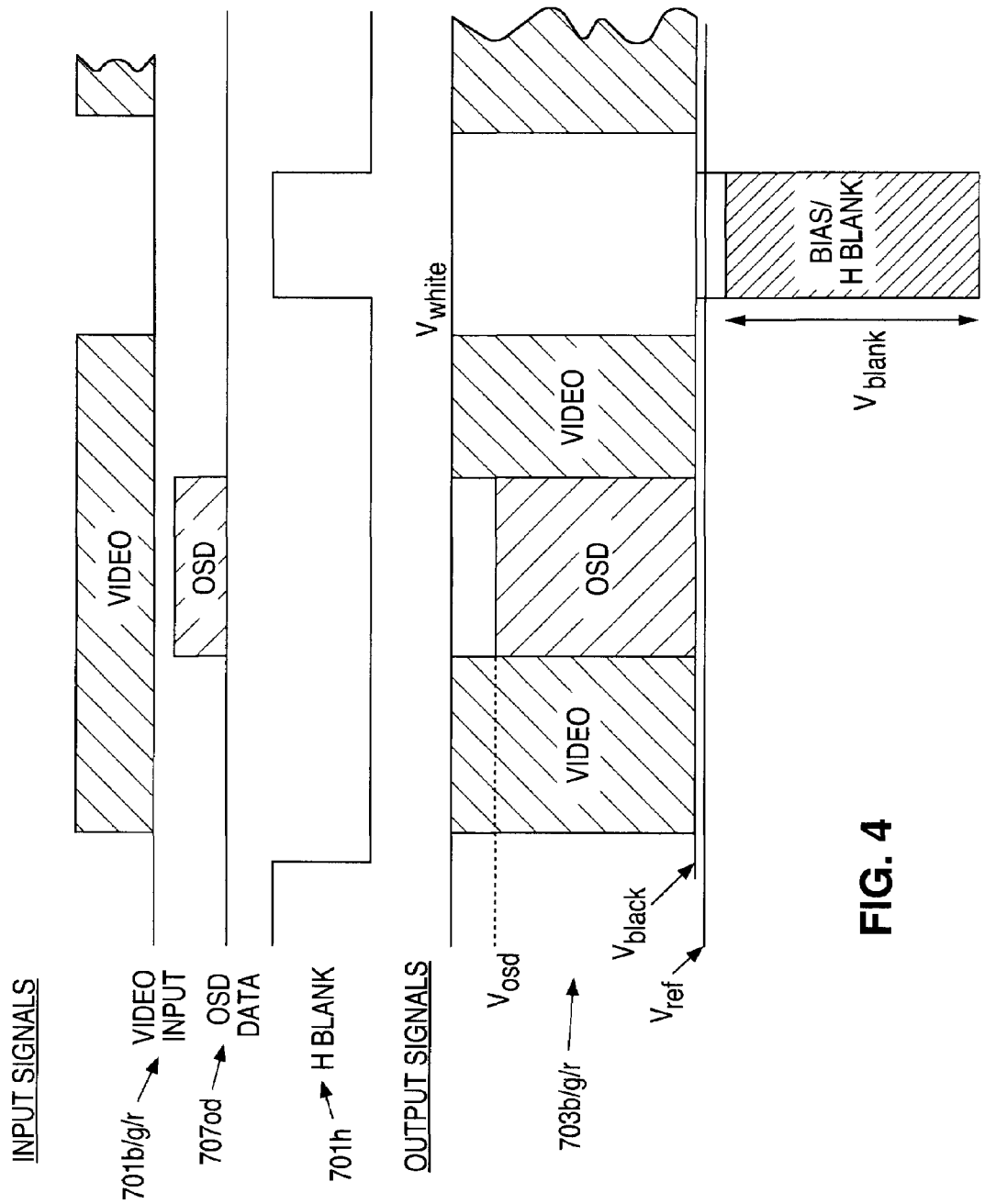
FIG. 4 is a signal diagram for exemplary signals of the circuitry of FIG. 3.

Referring to FIG. 4, the multiplexing of the video input 701b/g/r and OSD data 707od during the active period of the signal can be better understood. As shown, the OSD data is inserted within the appropriate area of the video signal so as to place the OSD information in the desired position within the displayed image. During the horizontal blanking intervals, as defined by the horizontal blanking signal 701h, bias and brightness control information is provided.

Figure 5:
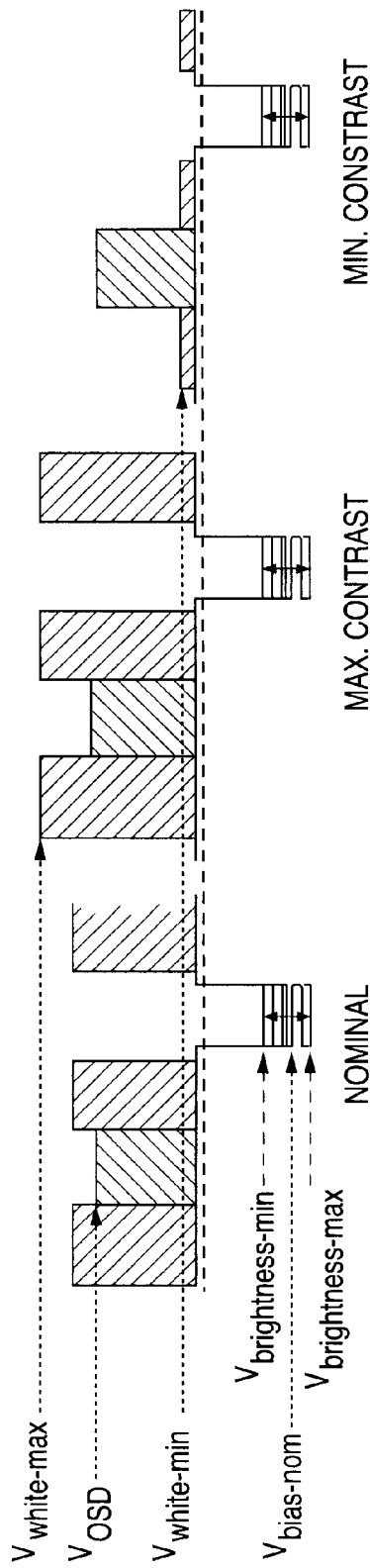
FIG. 5 is a signal diagram illustrating contrast control provided by the circuitry of FIG. 3.

Referring to FIG. 5, the contrast control provided by the contrast controller 712 (FIG. 3) can be better understood. As shown, the contrast control information 707c provides for the full range of contrast control between maximum and minimum white levels during the active period of the video signal. Also as shown, the level of the OSD information is unaffected since it is introduced into the video signal channel at a later point.

Figure 6:
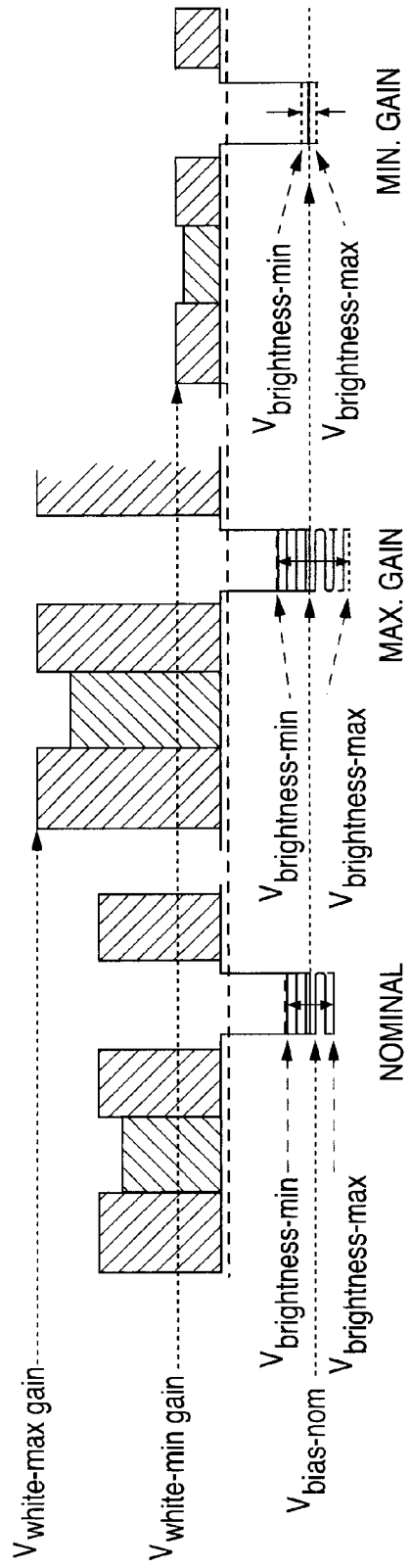
FIG. 6 is a signal diagram illustrating gain control provided the circuitry of FIG. 3.

Referring to FIG. 6, the gain control provided by the video gain controller 718 (FIG. 3) over the video and OSD information can be better understood. As shown, both video and OSD information are affected with full control provided between maximum and minimum white levels. Additionally, as shown, this gain control also affects the range of brightness control due to the use of the gain control signals 707g to control the brightness gain controller 720 (FIG. 3).

Figure 7:
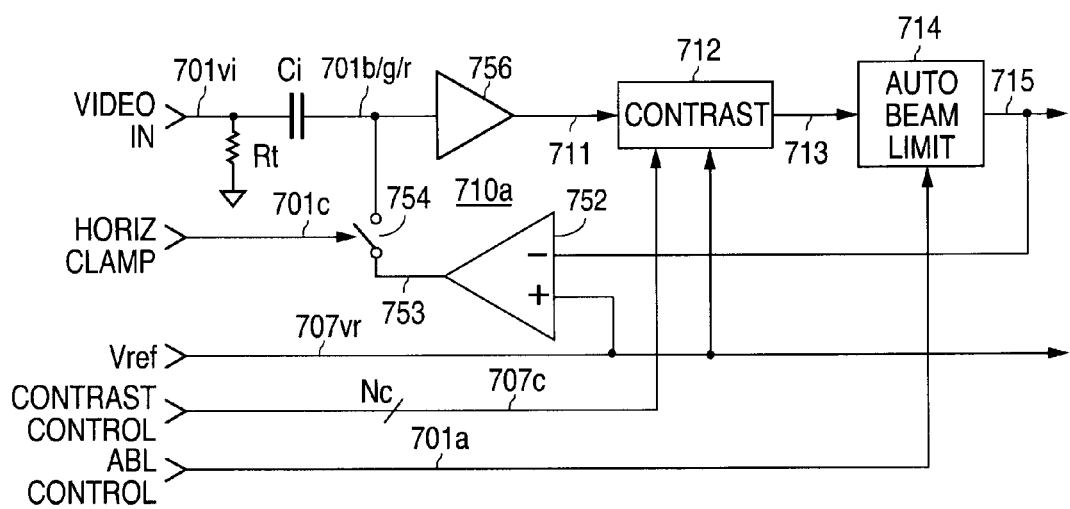
FIG. 7 is a functional block diagram of an exemplary technique used for clamping the incoming video signal in the circuitry of FIG. 3.

Referring to FIG. 7, a preferred implementation 710a of the clamping circuit 710 (FIG. 3) is represented. During a portion of the horizontal blanking interval, the horizontal clamp signal 701c is active and closes switch 754. This causes the DC voltage 753 from a comparator circuit 752 to be inserted into the signal path of the incoming AC-coupled video signal 701b/g/r. This DC voltage 753 is generated in accordance with the relative values of the reference voltage 707vr and the DC voltage level in the signal 715 at the output of the auto beam limit circuit 714 during the horizontal clamping time interval. The resulting DC-clamped video signal is buffered by a buffer amplifier 756 to produce the video signal 711 to be processed by the contrast controller 712 (as discussed above).

Figure 8:
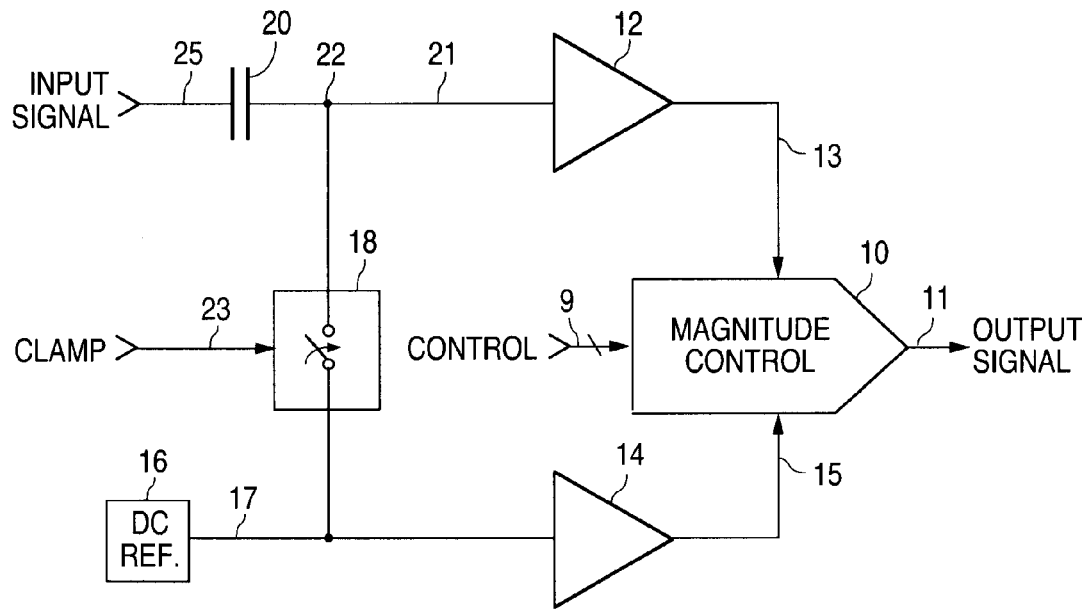
FIG. 8 is a functional block diagram of an analog signal system using a digitally controlled signal magnitude control circuit for imparting halftone in accordance with the presently claimed invention.

Referring to FIG. 8, an analog signal system using a digitally controlled signal magnitude control circuit in accordance with the presently claimed invention includes a magnitude control circuit 10, buffer amplifiers 12, 14, a DC reference voltage source 16, a synchronous switching circuit 18 and a series coupling capacitor 20. The input signal 25, which typically includes both AC and DC signal components, is AC-coupled to node 22 where it is summed with the DC reference voltage 17, via the switch circuit 18, during the DC clamping intervals as defined by the clamp signal 23 (e.g., such as during the horizontal blanking interval in the case of a video input signal). This DC-clamped signal 21 is buffered by the buffer amplifier 12. The DC reference voltage 17 is also buffered by a buffer amplifier 14.

These buffered composite (i.e., AC and DC) 13 and DC 15 signals are provided to the magnitude control circuit 10. In accordance with a digital control signal 9, the output signal 11 is another composite signal. This signal 11 includes a DC component equal to the buffered DC reference voltage 15 (as well as the buffered DC component of the input composite signal 13). This signal 11 further includes an AC component which is equal to the buffered AC component of the input composite signal 13 multiplied by the transfer function of the stage 10 as determined by the digital control signal 9. (For example, if the digital control signal 9 defines an attenuation of 5 decibels, the AC component in the output signal 11 is 5 decibels less than the AC component of the input signal 13.)

Figure 9:
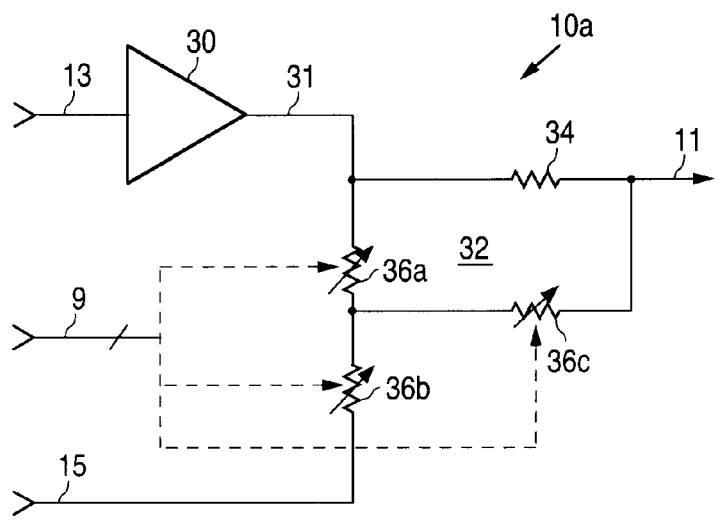
FIG. 9 is a circuit schematic diagram representing the operation of the digitally controlled signal magnitude control circuit of FIG. 8.

Referring to FIG. 9, the magnitude control circuit 10 of FIG. 8 can be represented by the embodiment 10a which includes an input buffer amplifier 30 and a digitally controlled resistive attenuator circuit 32. The DC reference voltage 15 is applied at the bottom, while the buffered composite signal 31 is applied at the top. In accordance with the digital control signal 9, variable resistances 36a, 36b, 36c are adjusted, thereby producing, in conjunction with a series resistance 34, a resistive attenuation factor. (Specific and more detailed embodiments of this resistive circuit 32 are discussed in more detail below.)

Figure 10:
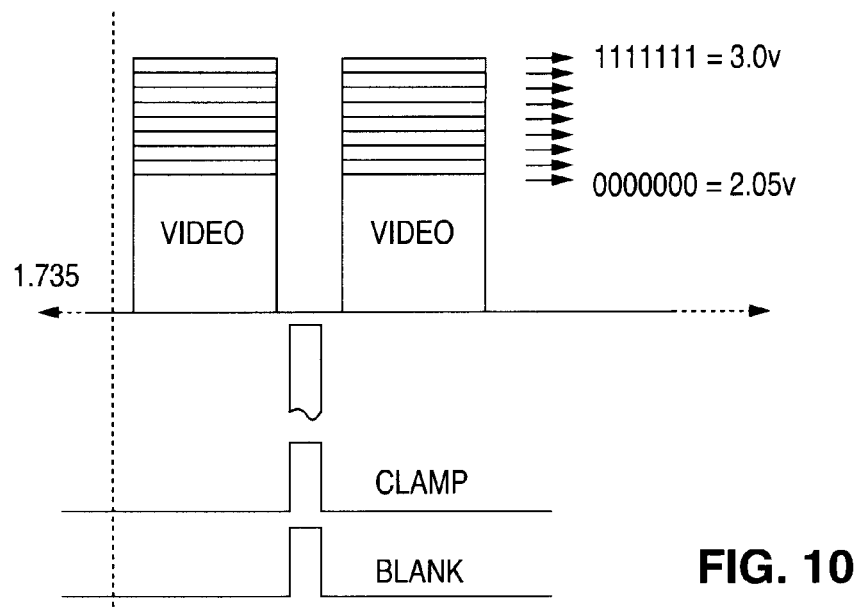
FIG. 10 is a signal diagram representing the signal magnitude control provided by the circuit of FIG. 8.

Referring to FIG. 10, operation of the circuit of FIG. 8 when used to process a clamped video signal can be better understood. During the horizontal blanking interval, the DC reference voltage 17 (FIG. 8) clamps the AC-coupled input signal. During the active video or OSD (on screen display) portions of the input signal 25, the digital control signal 9 determines the attenuation of the buffered composite signal 13 to establish the level of the output signal 11. In this example, for a 7-bit control signal 9, the output signal 11 can be adjusted over the range of 2.05 volts (maximum attenuation) through 3.0 volts (minimum attenuation).

Figure 11:
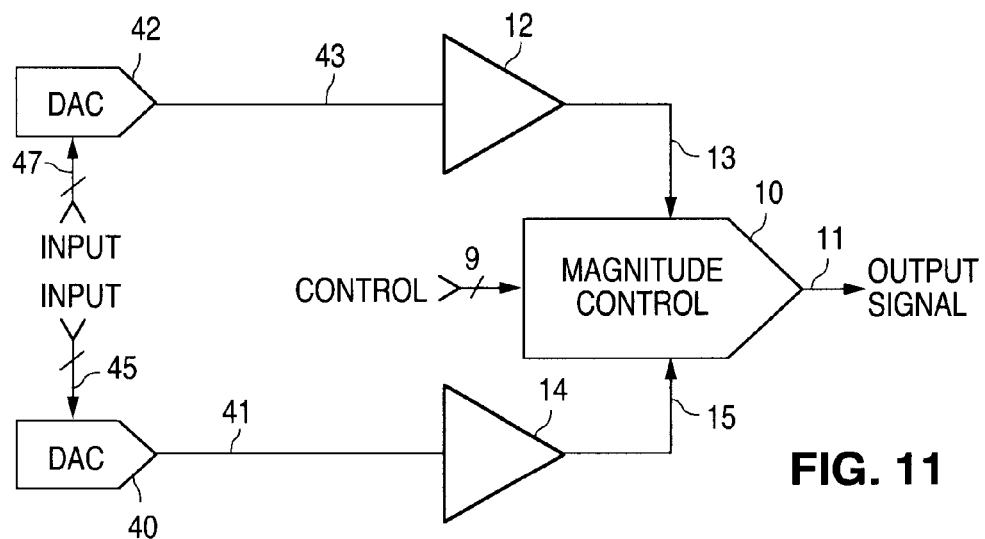
FIG. 11 is a functional block diagram of an analog signal system using a digitally controlled signal magnitude control circuit for imparting halftone in further accordance with the presently claimed invention.

Referring to FIG. 11, in accordance with another embodiment of the present invention, the magnitude control circuit 10 can be used to process, in accordance with the reference voltage 15, a variable DC voltage signal 13. In the case of a video signal system, for example, this voltage 13 can be the brightness control for the display monitor. A digital input signal 47 is varied in value in accordance with the desired brightness setting. This signal 47 drives a digital-to-analog converter circuit (DAC) 42, thereby producing a variable analog voltage signal 43 which is buffered by the buffer amplifier 12 to drive the top of the magnitude control circuit 10. Similarly, the DC reference source can be implemented using another DAC 40, thereby allowing the DC reference voltage 15 to also be established in accordance with a digital control signal 45.

Figure 12A:
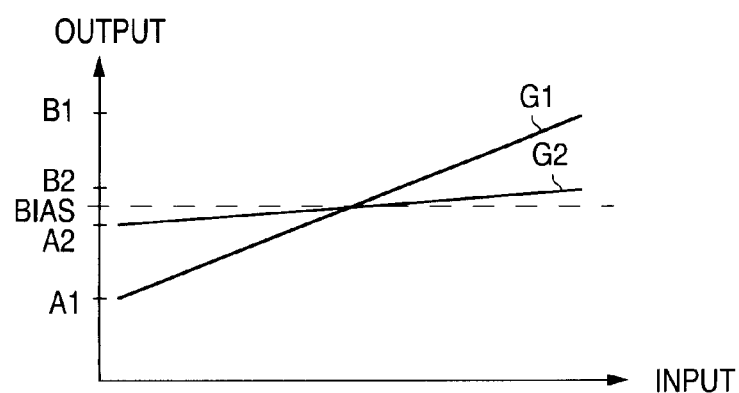
FIG. 12A is a graph representing the operation of a digitally controlled signal magnitude control circuit of FIG. 11 when used to control the attenuation profile of a variable DC signal.

Referring to FIG. 12A, the effect of the digital control signal 9 upon the resulting variable DC output signal 11 from the circuit of FIG. 11 can be better understood. For a minimum attenuation (or maximum gain) as defined by the digital control signal 9, the output signal 11 will vary between values A1 and B1 with a slope G1 as shown. Conversely, for a maximum attenuation (or minimum gain), the output signal 11 will vary over a range of A2 through B2 with a slope of G2 as shown. These ranges can be shifted up (more positive) or down (more negative) in accordance with the bias voltage BIAS which is established by the DC reference voltage 15. These ranges of values of the variable DC output signal 11, as compared to the corresponding ranges of values of the input variable DC voltage signal 13, are determined by the attenuation factor established by the digital control signal 9.

Figure 12B:
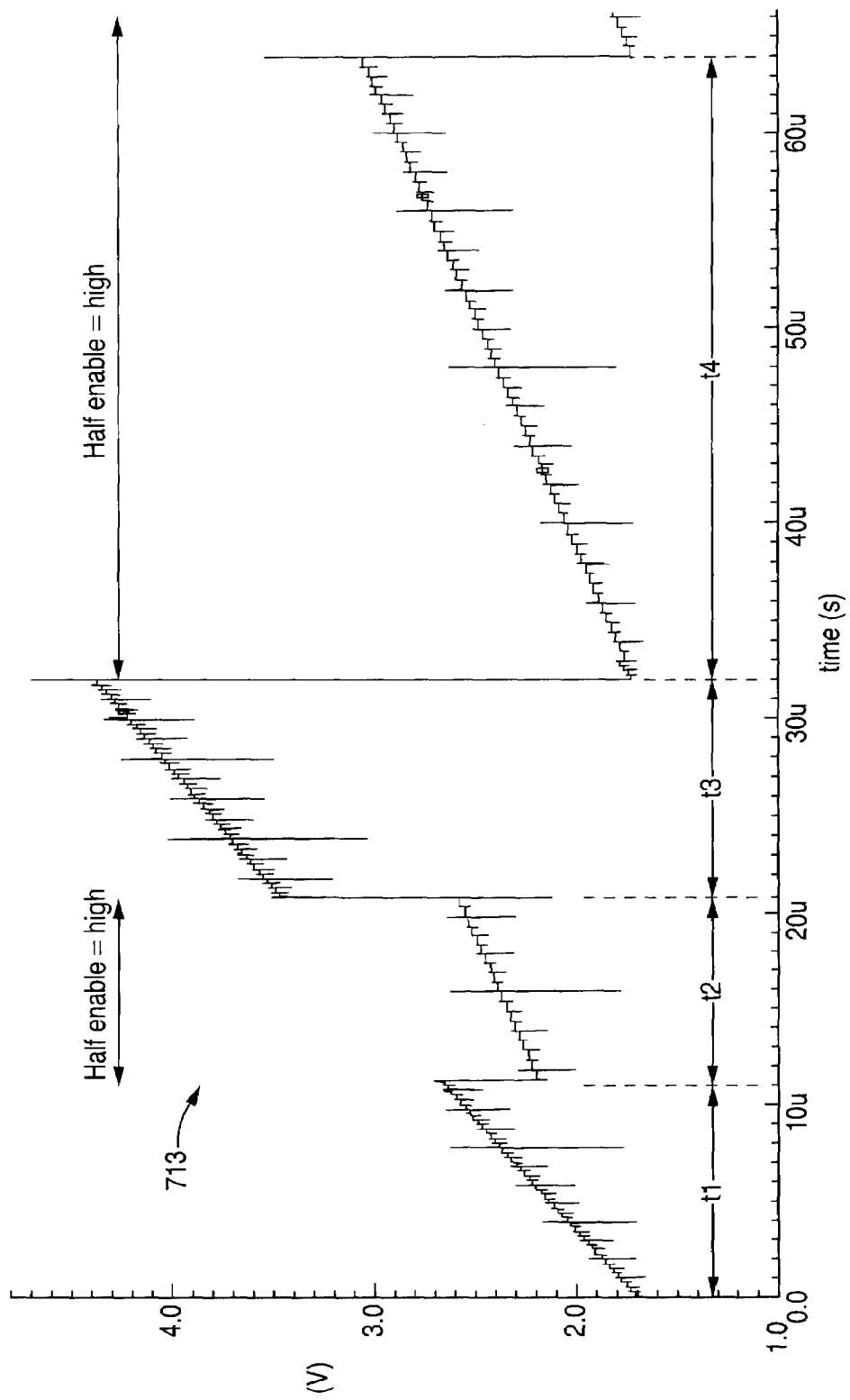
FIG. 12B is a signal timing diagram of a simulation in which halftone and normal contrast are imparted to a monotonically varying video signal.

Referring to FIG. 12B, this effect is shown in a dynamic context. For example, the contrast-controlled video signal 713 (FIG. 3), a periodic and monotonically increasing video signal in this case, has normal contrast during time intervals t1 and t3, and halftone contrast during time intervals t2 and t4. As can be seen, consistent with the discussion above for FIG. 12A, the slopes of the video signal during the normal t1, t3 and halftone t2, t4 contrast intervals are different.

Figure 13A:
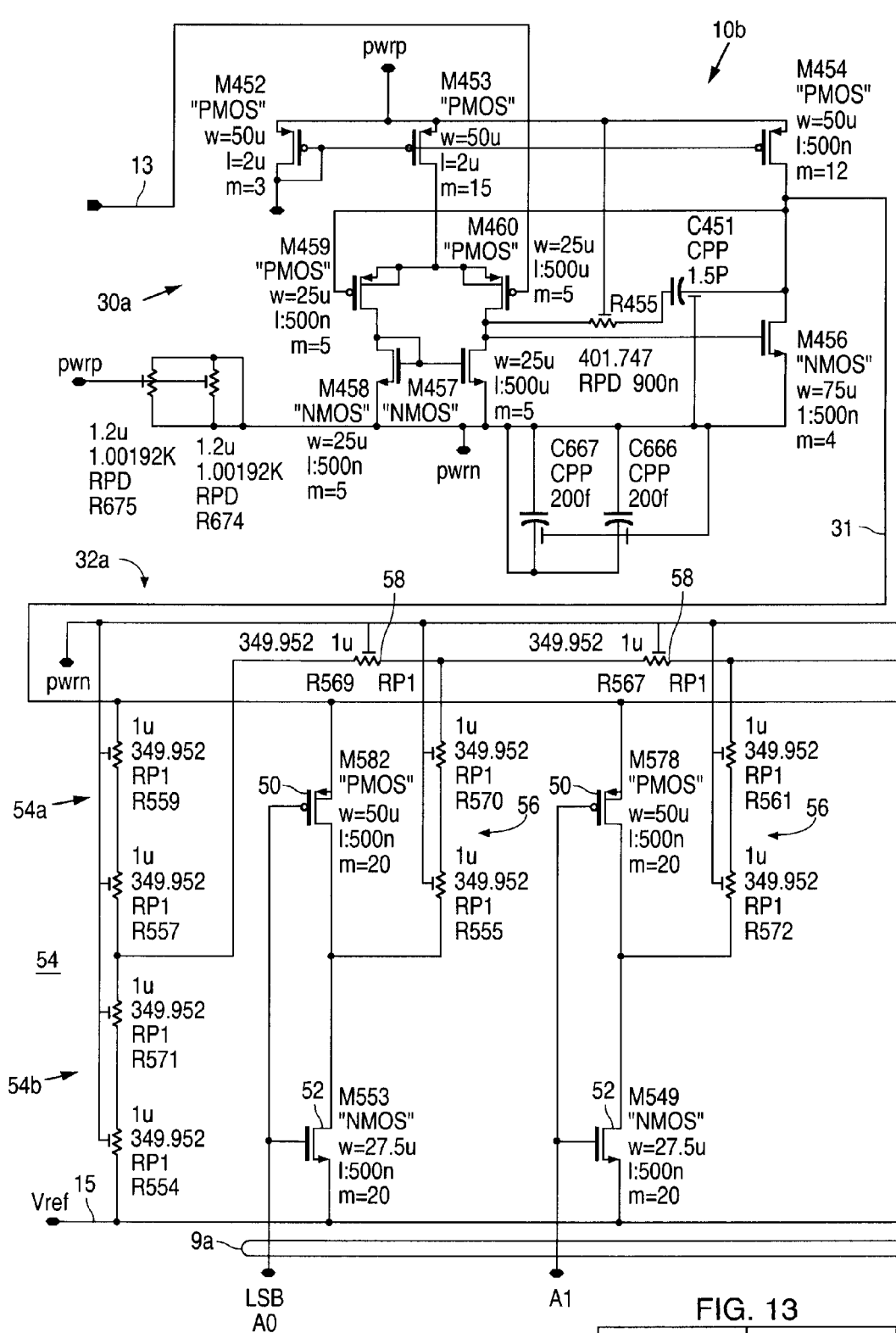
FIG. 13 (13A and 13B) is a circuit schematic diagram of an exemplary embodiment of the digitally controlled signal magnitude control circuit of FIGS. 8 and 11.
Figure 13B:
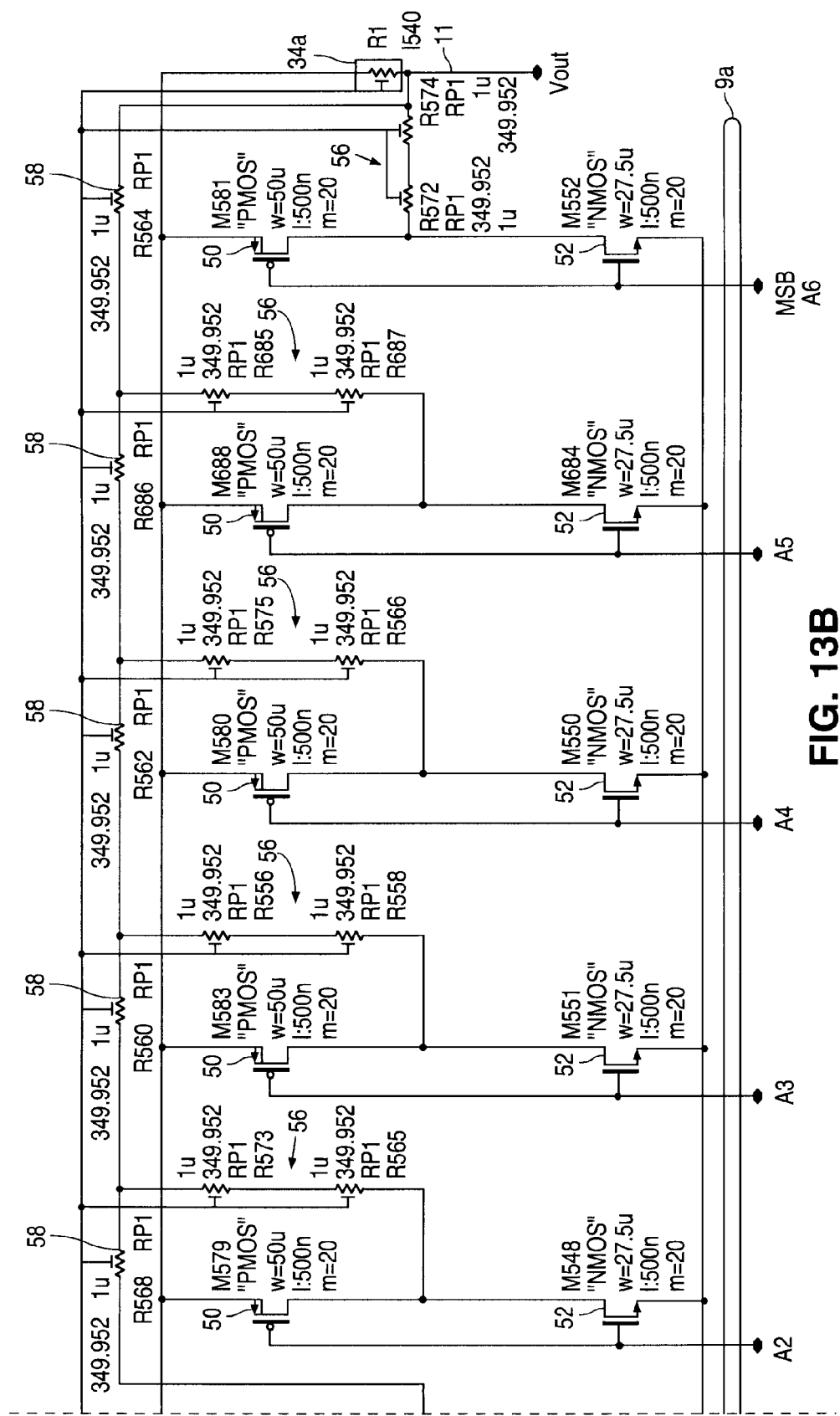

Referring to FIG. 13, one embodiment 10b of the magnitude control circuit 10 (FIGS. 8 and 11) can be implemented as shown. The input buffer amplifier 30 is implemented as a complementary MOSFET amplifier 30a. As discussed above (in connection with FIG. 29), the buffered signal 31 drives the top of the resistive array 32a, while the DC reference voltage 15 drives the bottom. Series-connected pass transistors in the form of P-type MOSFETs 50 and N-type MOSFETs 52 and a set of series resistances 54 are connected between the nodes driven by the signal 31 and reference voltage 15. (In this example, due to the integrated circuit structure being used, the various resistors 54, 56, 58 are implemented using MOSFET devices with fixed bias potentials (PWRP or PWRN, as appropriate) applied to their respective gate terminals.)

In accordance with the binary states of the bits A0–A6 (in this case 7 bits) of the digital control signal 9a, the pass transistors 50, 52 cause the bottom ends of resistor circuits 56 to be driven by either the buffered signal 31 or the reference voltage 15. This has the effect of connecting various permutations of series resistors 58 and shunt resistors 56 across either the upper portion 54a or lower portion 54b of the shunt resistive circuit 54 on the input side. The resulting net resistance interacts with the series fixed resistance 34a to produce the desired attenuation factor. This selective connecting of the various resistances in this manner produces the variable resistances 36a, 36b, 36c depicted in the circuit diagram of FIG. 9.

Figure 14A:
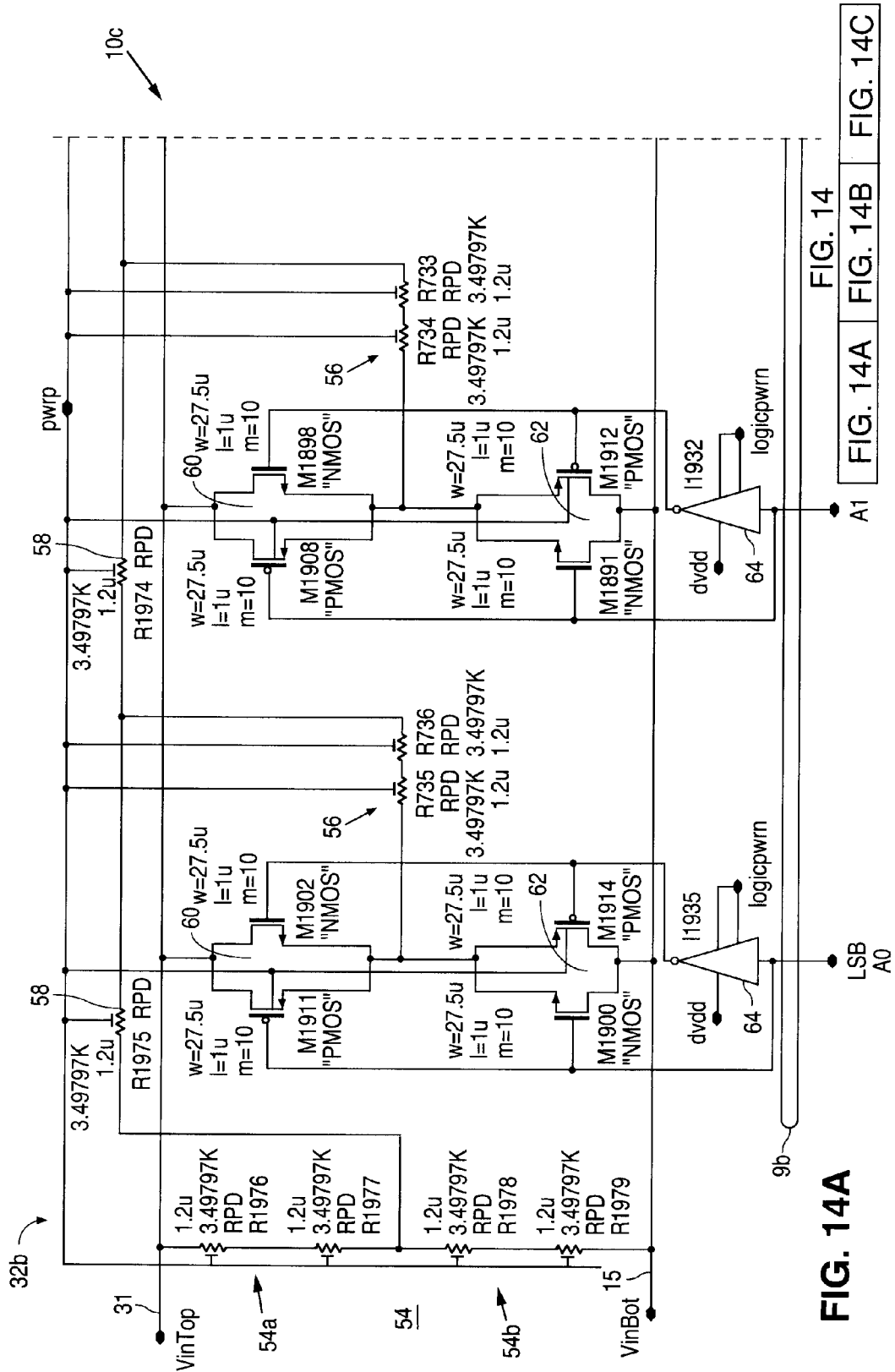
FIG. 14 (14A, 14B and 14C) is a circuit schematic diagram of another exemplary embodiment of the digitally controlled signal magnitude control circuit of FIGS. 8 and 11.
Figure 14B:
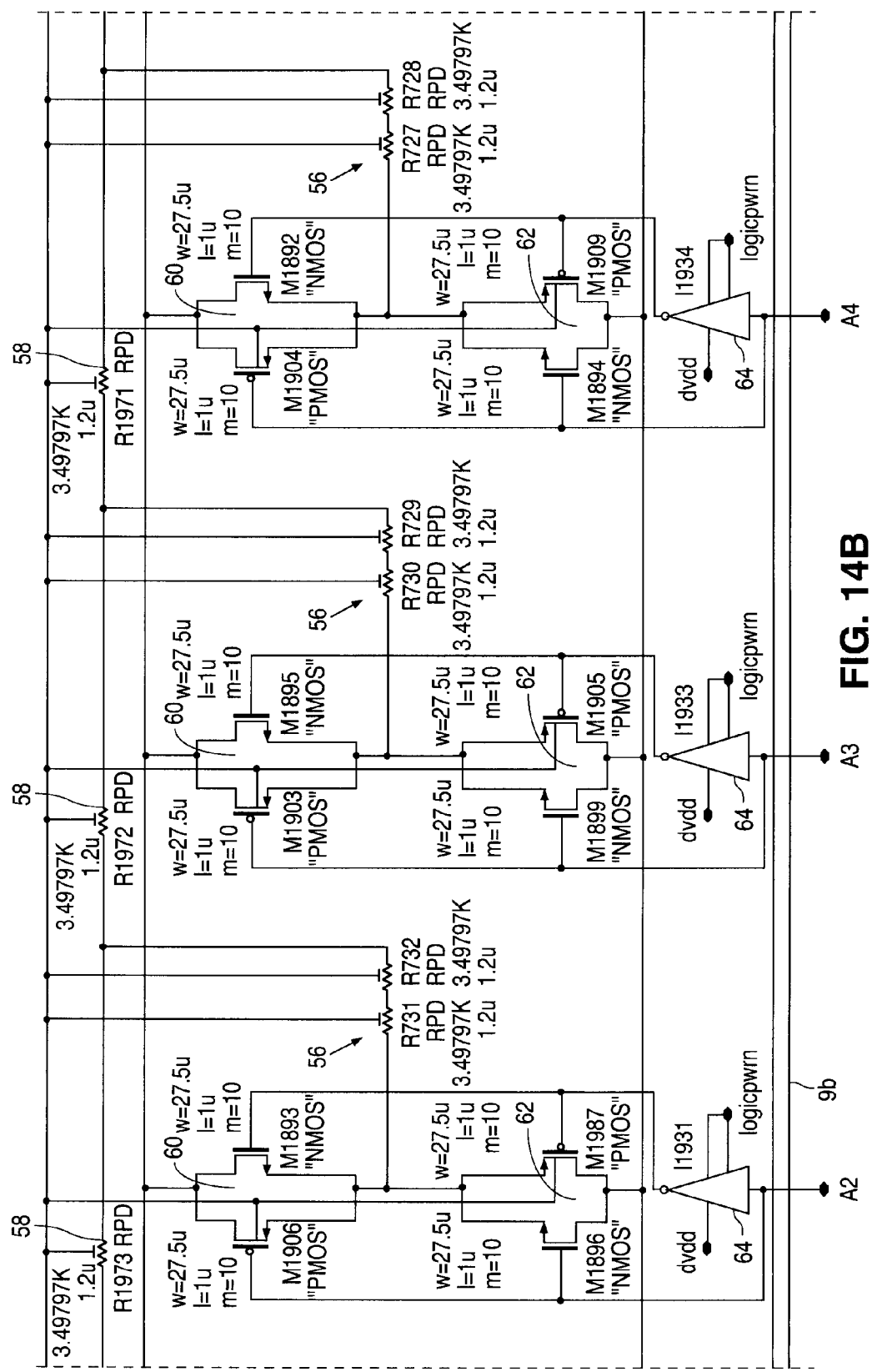
Figure 14C:
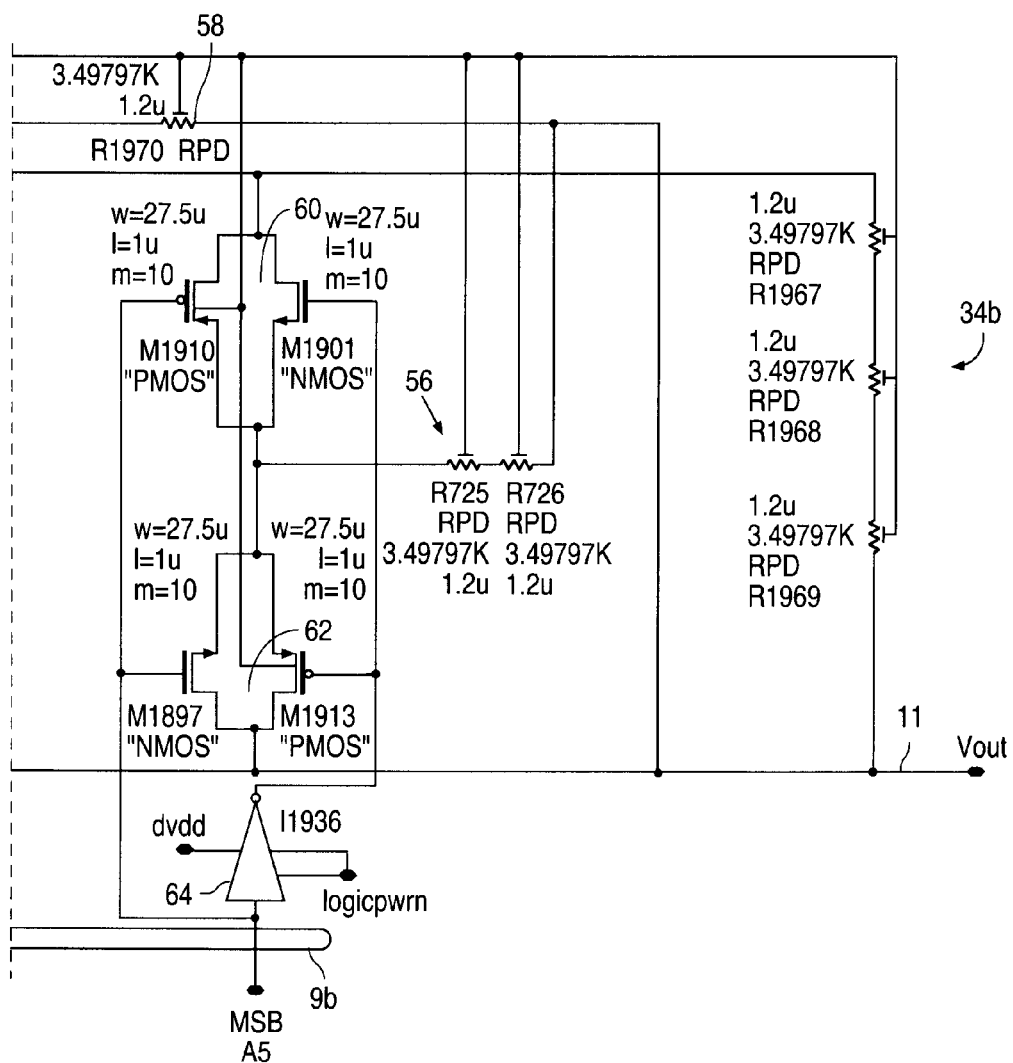

Referring to FIG. 14, another embodiment 10c of the magnitude control circuit 10 uses the same basic technique of switching resistances to produce the variable resistive network depicted in FIG. 9, but uses transmission gate circuits 60, 62 in place of the pass transistors 50, 52. Accordingly, the individual bits A0–A5 (in this case 6 bits) of the digital control signal 9b are also inverted using inverter circuits 64 for driving the transmission gate circuits 60, 62. This circuit 32b operates in an manner similar to that of the circuit 32a of FIG. 13. However, the transmission gate circuits 60, 62 provide improved isolation for when the incoming signal 31 is a variable DC voltage which may, at times, be more negative than the DC reference voltage 15. This allows the nodes driven by the signal 31 and reference voltage 15 to "flip" in polarity with respect to each other as needed. In other words, as shown in the graph of FIG. 12A, the output signal 11 may sometimes be more negative than the DC reference voltage 15 providing the bias potential. Using transmission gate circuits 60, 62 allows this to be done more reliably.

Figures 1, 2:
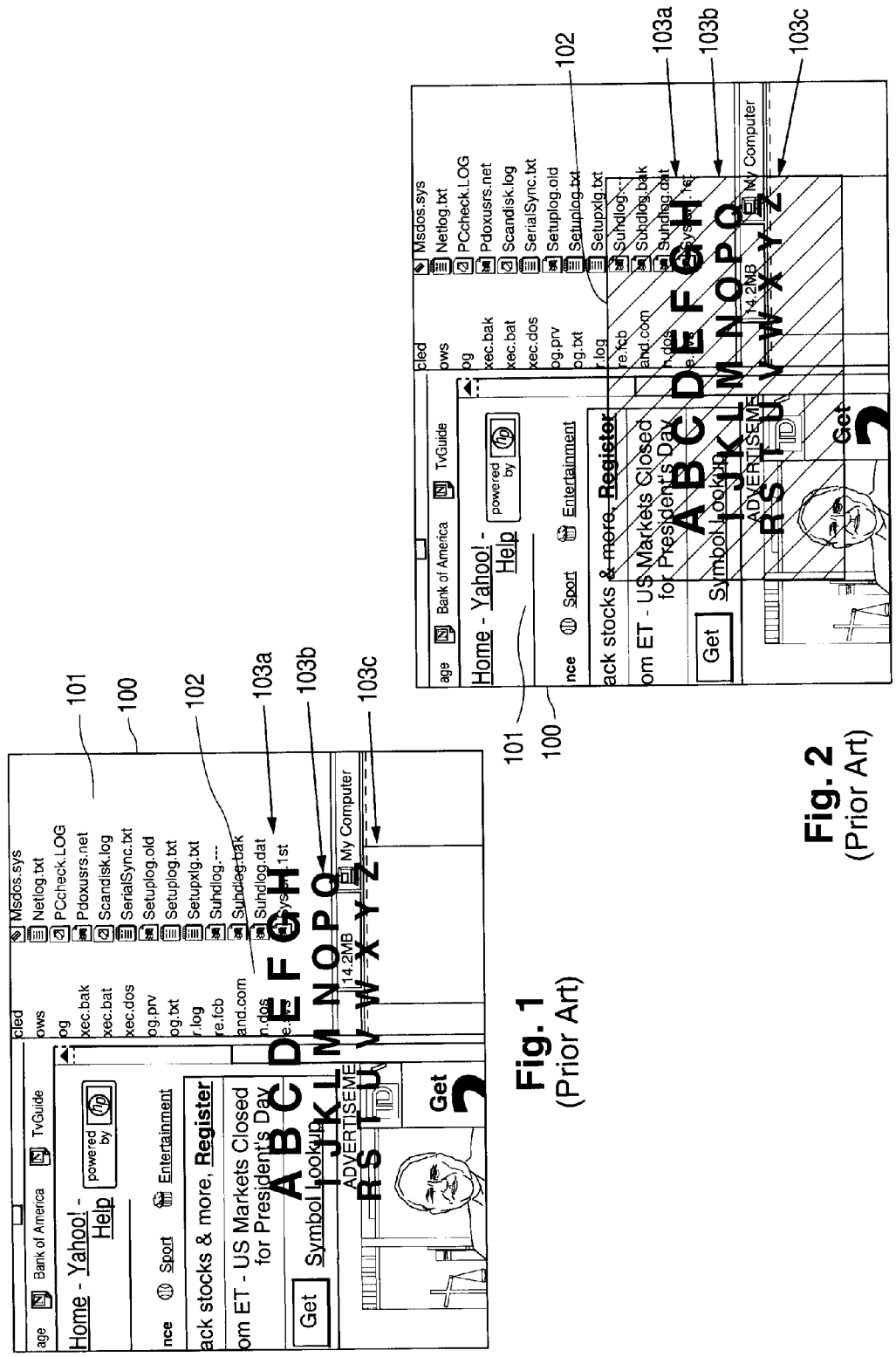
FIG. 1 illustrates a video display containing video image information over which OSD information is also displayed.
FIG. 2 illustrates the video display of FIG. 1 in which the video image information coincident with the OSD window has reduced contrast.
Figure 15:
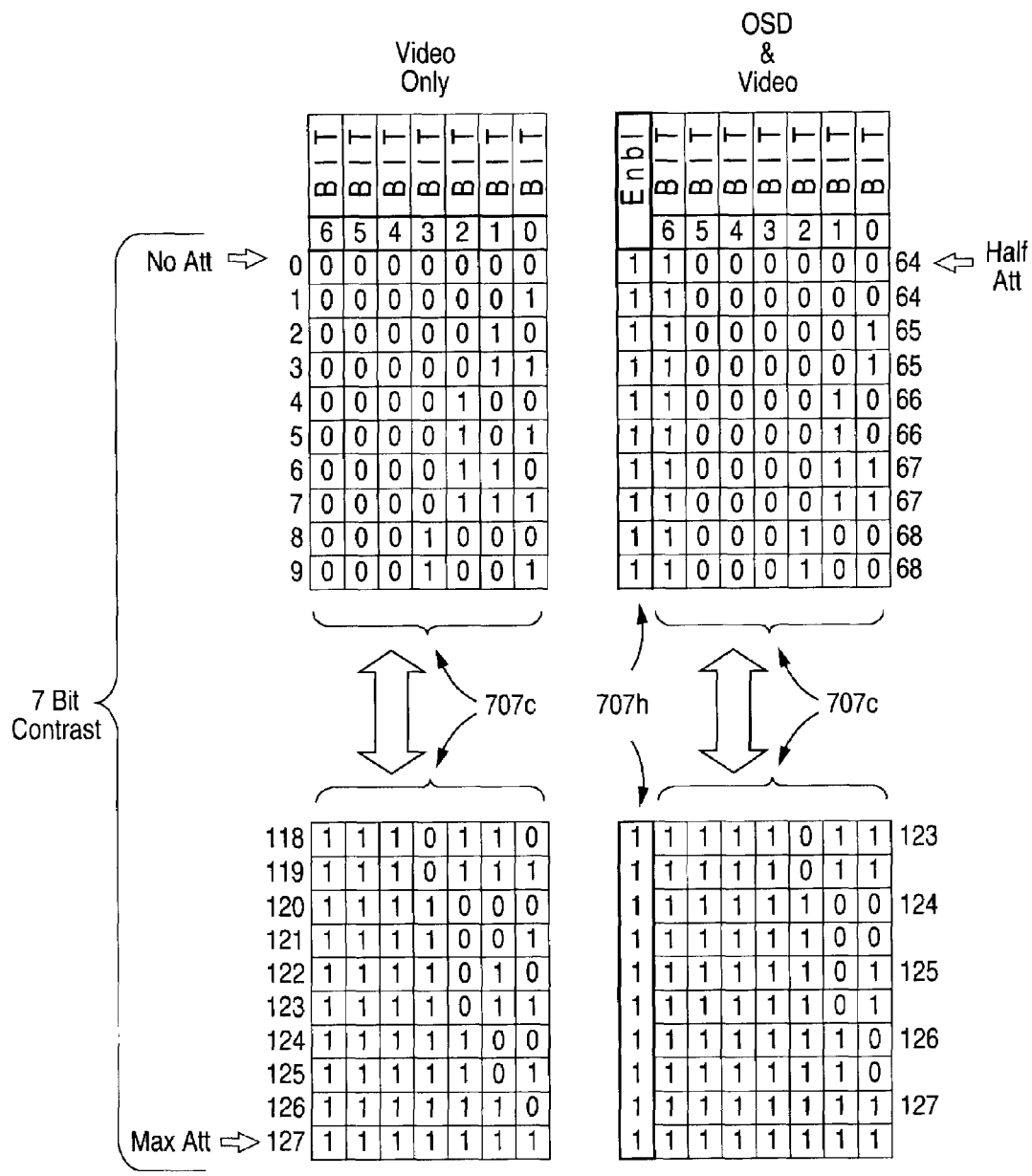
FIG. 15 illustrates two binary tables containing the binary information corresponding to the normal contrast and halftone control signals applied to the contrast controller in the circuitry of FIG. 3.

Referring to FIG. 15, the interaction between and effect of the halftone 707h and normal contrast 707c control signals can be better understood. The halftone control signal 707h corresponds to one digital bit of information, while, for purposes of this example, the contrast control signal 707c contains six bits, similar to the discussion above for the circuit of FIG. 13. During the time interval in which the OSD window 102 (FIG. 2) is to be displayed, the halftone control signal 707h, also referenced herein as an "enabling" signal, is asserted (e.g., as a logic one) and the bits of the contrast control signals 707c are shifted right, i.e., toward the least significant bits (LSB), by one bit with the original LSB thereby being dropped. This corresponds to a contrast value equal to half of that without assertion of the halftone control signal 707h and the resulting right-shifting of the contrast signal control signal 707c bits.

Figure 16A:
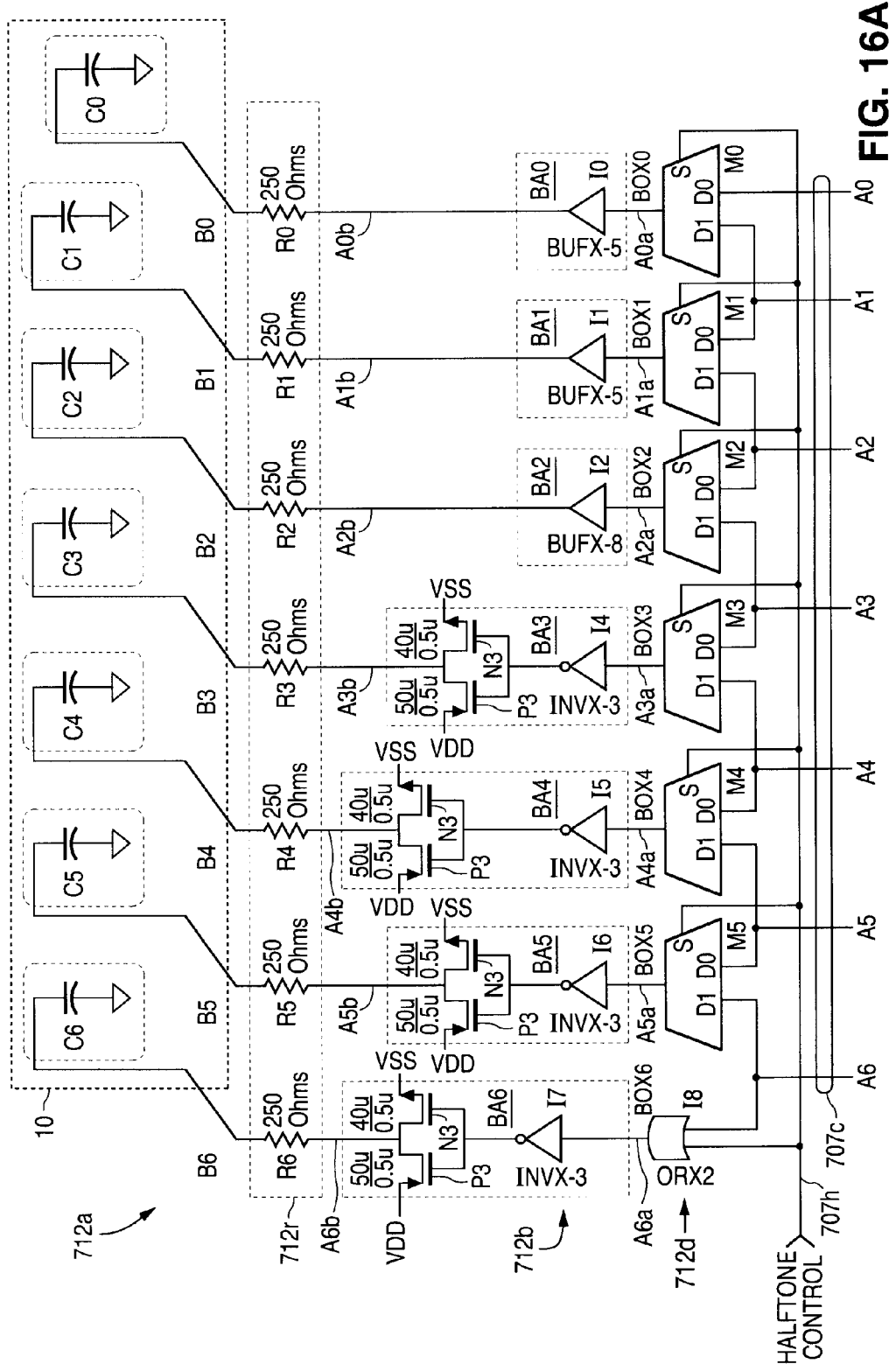
FIG. 16A is a functional block and circuit schematic diagram of one embodiment of signal decoding circuitry used for decoding the contrast control data in accordance with the halftone control signal to impart halftone to a video signal in accordance with the presently claimed invention.

Referring to FIG. 16A, one embodiment 712a of the contrast controller 712 (FIG. 3) includes decoder circuitry 712d and buffer circuitry 712b. The decoder circuitry 712d, comprising signal selection circuitry in the form of multiplexor circuits M0, M1, M2, M3, M4, M5 and logic OR circuitry 18. The halftone control signal 707h serves as the control signal for the individual multiplexors M0, M1, M2, M3, M4, M5, each of which selects between one of two mutually adjacent bits of the contrast control signal 707c. For example, multiplexor M5, in response to the halftone control signal 707h, selects between the most significant bit (MSB) A6 and the next less significant bit A5. The halftone control signal 707h is also logically OR'ed with the MSB A6. As a result of this configuration of elements and interconnection of signals, assertion of a halftone control signal produces the above-discussed right-shifting of the input bits A0, A1, A2, A3, A4, A5, A6 of the contrast control signal 707c at the output of the multiplexors M0, M1, M2, M3, M4, M5 and OR circuitry 18.

The decoded signals A0a, A1a, A2a, A3a, A4a, A5a, A6a are buffered by respective buffer amplifiers BA0, BA1, BA2, BA3, BA4, BA5, BA6 to provide corresponding buffered decoded signals A0b, A1b, A2b, A3b, A4b, A5b, A6b for driving the switching transistors within the magnitude control circuitry 10, which are represented here as capacitances C0, C1, C2, C3, C4, C5, C6. For example, referring again to FIG. 13, the switching transistors M582, M553 driven by the buffered LSB signal A0b will have a capacitance C0 associated with them due to their gate terminal capacitances, as well as various stray signal path capacitances. Additionally, compensation circuitry 712r in the form of resistive circuit elements R0, R1, R2, R3, R4, R5, R6 connected in series with the buffered decoded signals A0b, A1b, A2b, A3b, A4b, A5b, A6b is included to provide for stability by preventing excessive ringing or peaking of the transient signal response and limiting the bandwidth of the input terminals B0, B1, B2, B3, B4, B5, B6 to the magnitude control circuitry 10.

Additionally, so as to provide better matching between the output circuitry of the buffer amplifiers BA0, BA1, BA2, BA3, BA4, BA5, BA6 and the corresponding impedances at the magnitude control circuitry 10 input terminals B0, B1, B2, B3, B4, B5, B6 associated primarily with the input switching transistors 50, 52 (FIG. 13), the PMOS transistors P3 and NMOS transistors N3 of the output stages of the buffer amplifiers have predetermined transistor channel dimensions which vary in a monotonic manner between the MSB buffer amplifier BA6 and LSB buffer amplifier BA0. For example, as is shown, output transistors P3 for buffer amplifiers BA6, BA5b, BA4 and BA3 have channels which are 0.5 microns in length and 50 microns in width, while output transistors N3 have channels which are 0.5 microns long and 40 microns wide. Although not shown, output transistor P3 of buffer amplifier BA2 has a channel length of 0.5 microns and a channel width of 18 microns, while output transistor N3 has a channel length of 0.5 microns and a channel width of 6 microns. For buffer amplifiers BA1 and BA0, output transistor P3 has a channel 0.5 microns long and 11 microns wide, while output transistor N3 has a channel 0.5 microns long and 4 microns wide. (As is well known in the art, such channel dimensions do not necessarily mean that a single transistor channel 50 microns wide is used, e.g., for output transistor P3 of buffer amplifier BA6, but, in accordance with well known transistor design techniques, multiple transistors can be used and connected in parallel with the sum of all transistor channel widths equaling the desired 50 microns.) It will be understood that other transistor channel dimensions may be selected in accordance with well known circuit design techniques to achieve the compensation effects deemed necessary for the input circuit impedances associated with the magnitude control circuitry 10.

Figure 16B:
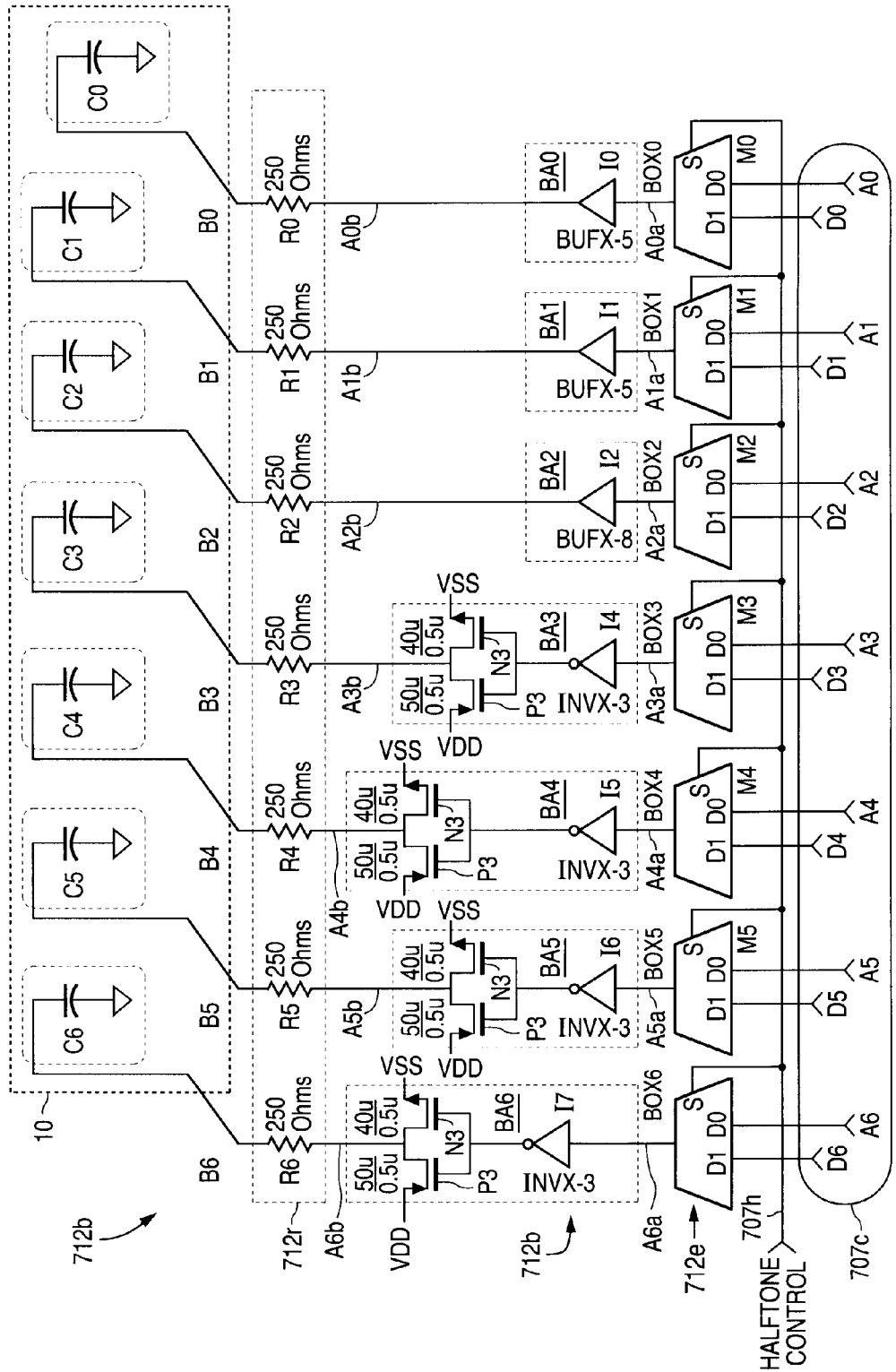
FIG. 16B is a functional block and circuit schematic diagram of another embodiment of signal decoding circuitry used for decoding the contrast control data in accordance with the halftone control signal to impart halftone to a video signal in accordance with the presently claimed invention.

Referring to FIG. 16B, another embodiment 712b of the contrast controller 712 (FIG. 3) also includes decoder circuitry 712e and buffer circuitry 712b. In this embodiment 712b, the decoder circuitry 712e uses another multiplexor circuit M6 in place of the OR circuitry 18, the halftone control signal 707h serves as the control signal for the individual multiplexors M0, M1, M2, M3, M4, M5, M6, and the contrast control signal 707c includes two sets of contrast data bits: A0, A1, A2, A3, A4, A5, A6; and D0, D1, D2, D3, D4, D5, D6. One set of contrast data, e.g., A0–A6, controls or establishes one contrast level, e.g., "normal" contrast, while the other set of contrast data, e.g., D0–D6, controls or establishes another contrast level, e.g., "halftone" contrast. It should be understood that with two independent sets of contrast control data the so-called "halftone" contrast level need not necessarily be one-half the contrast level of the so-called "normal" contrast level, but rather will simply be a reduced contrast level.

Also, as will be readily apparent, regardless of whether one (FIG. 16A) or two FIG. 16B) sets of contrast control data are used, such contrast control data 707c, in appropriate conjunction with the halftone control signal 707h, can be dynamic in the sense that it can be altered in real time, e.g., on a frame-by-frame or even line-by-line basis, as necessary to achieve whatever variable contrast effect may be desired.

Figure 17:
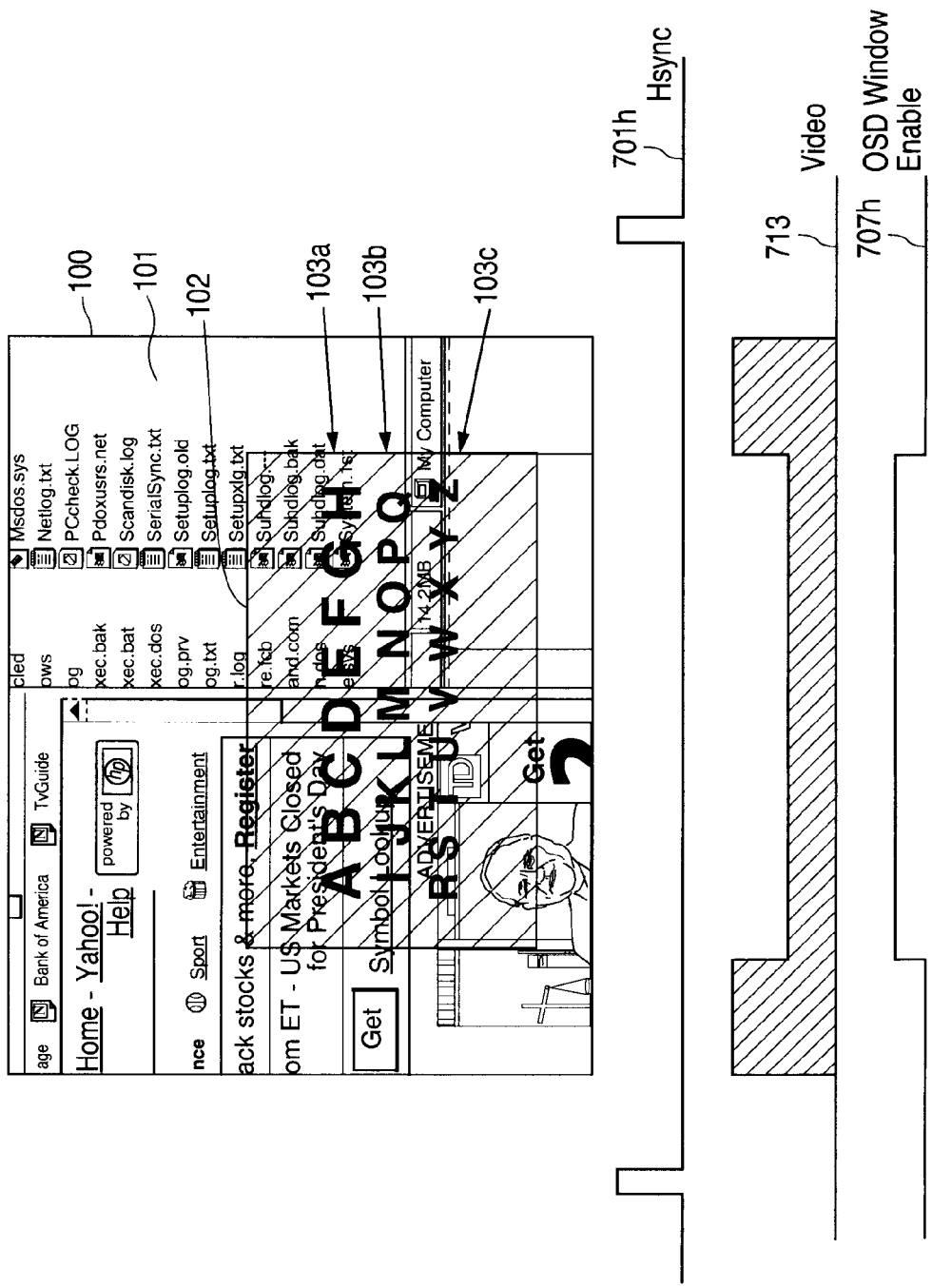
FIG. 17 illustrates the timing relationship between the halftone control signal and the video signal during display of an OSD window.

Referring to FIG. 17, the temporal relationship between assertion of the halftone control signal 707h, the resulting halftone contrast for the video signal 713 and the resulting display of the halftone OSD window 102 can be better understood.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a decoder for providing a plurality of digital contrast control signals for a video signal, comprising:

a halftone control terminal to convey a halftone control signal with first and second signal statuses corresponding to first and second contrast ranges, respectively, for a video signal;

a plurality of contrast control terminals to convey a plurality of contrast control signals including a first portion corresponding to said first video signal contrast range and including, in successive adjacency, a first least significant bit (LSB) signal, at least one first intermediate significance bit (ISB) signal and a first most significant bit (MSB) signal;

signal decoding circuitry, coupled to said halftone control terminal and said plurality of contrast control terminals, that responds to reception of said halftone control signal and said plurality of contrast control signals by providing a plurality of decoded control signals which, responsive to said first and second halftone control signal statuses, corresponds to said first and second video signal contrast ranges, respectively, wherein said second video signal contrast range is less than said first video signal contrast range; and buffer circuitry, coupled to said signal decoding circuitry, that responds to reception of said plurality of decoded control signals by providing a like plurality of buffered control signals.

2. The apparatus of claim 1, wherein said signal decoding circuitry comprises signal selection circuitry that responds to said reception of said halftone control signal by selecting one signal within each one of a plurality of pairs of mutually adjacent signals among said first LSB, said at least one first ISB and said first MSB contrast control signals.

3. The apparatus of claim 1, wherein said signal decoding circuitry comprises a plurality of multiplexor circuits each of which is coupled to said halftone control terminal and a respective portion of said plurality of contrast control terminals via which are conveyed mutually adjacent ones of said first LSB, said at least one first ISB and said first MSB contrast control signals.

4. The apparatus of claim 3, wherein said signal decoding circuitry further comprises a logic OR circuit coupled to said halftone control terminal and one of said plurality of contrast control terminals via which said first MSB contrast control signal is conveyed.

5. The apparatus of claim 1, wherein said buffer circuitry comprises a plurality of buffer stages which includes:

a plurality of input inverter circuits each of which responds to reception of a respective one of said plurality of decoded control signals by providing a corresponding inverted control signal; and a plurality of output inverter circuits, coupled to said plurality of input inverter circuits, each of which responds to reception of said inverted control signal by providing a respective one of said plurality of buffered control signals.

6. The apparatus of claim 5, wherein:

said plurality of output inverter circuits comprises a corresponding plurality of sets of field effect transistors having respective sets of predetermined channel dimensions; and selected successively adjacent ones of said sets of predetermined channel dimensions vary monotonically.

7. The apparatus of claim 1, wherein:

said plurality of decoded control signals comprises, in successive adjacency, an LSB signal, at least one ISB signal and an MSB signal; and said MSB decoded control signal, responsive to said first and second halftone control signal statuses, corresponds to said first MSB contrast control signal and said halftone control signal, respectively.

8. The apparatus of claim 1, wherein:

said plurality of contrast control signals further includes a second portion corresponding to said second video signal contrast range and including, in successive adjacency, a second LSB signal, at least one second ISB signal and a second MSB signal; and said signal decoding circuitry comprises signal selection circuitry that responds to said reception of said halftone control signal by selecting between corresponding ones of said first and second LSB contrast control signals, said first and second ISB contrast control signals, and said first and second MSB contrast control signals.

9. The apparatus of claim 1, wherein:

said plurality of contrast control signals further includes a second portion corresponding to said second video signal contrast range and including, in successive adjacency, a second LSB signal, at least one second ISB signal and a second MSB signal; and said signal decoding circuitry comprises a plurality of multiplexor circuits each of which is coupled to said halftone control terminal and respective portions of said plurality of contrast control terminals via which are conveyed corresponding ones of said first and second LSB contrast control signals, said first and second ISB contrast control signals, and said first and second MSB contrast control signals.

10. An apparatus including a decoder for providing a plurality of digital contrast control signals for a video signal, comprising:

halftone controller means for conveying a halftone control signal with first and second signal statuses corresponding to first and second contrast ranges, respectively, for a video signal, wherein said second video signal contrast range is less than said first video signal contrast range;

contrast controller means for conveying a plurality of contrast control signals including a first portion corresponding to said first video signal contrast range and including, in successive adjacency, a first least significant bit (LSB) signal, at least one first intermediate significance bit (ISB) signal and a first most significant bit (MSB) signal;

signal decoder means for receiving said halftone control signal and said plurality of contrast control signals and in response thereto generating a plurality of decoded control signals which, responsive to said first and second halftone control signal statuses, corresponds to said first and second video signal contrast ranges, respectively; and buffer means for receiving said plurality of decoded control signals and in response thereto generating a like plurality of buffered control signals.

11. The apparatus of claim 10, wherein said plurality of contrast control signals further includes a second portion corresponding to said second video signal contrast range and including, in successive adjacency, a second LSB signal, at least one second ISB signal and a second MSB signal.

* * * * *